US012174900B2

(12) United States Patent
Iwan et al.

(10) Patent No.: US 12,174,900 B2
(45) Date of Patent: Dec. 24, 2024

(54) AUTOMATIC UPDATES TO INSTRUCTION DOCUMENTS USING CROWDSOURCING

(71) Applicant: Capital One Services, LLC, McLean, VA (US)

(72) Inventors: Grant Michael Iwan, Montpelier, VA (US); Mohamed Seck, Aubrey, TX (US); Shannon Reid, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/310,249

(22) Filed: May 1, 2023

(65) Prior Publication Data
US 2024/0370503 A1    Nov. 7, 2024

(51) Int. Cl.
*G06F 16/93*        (2019.01)
*G06F 8/65*         (2018.01)

(52) U.S. Cl.
CPC .............. *G06F 16/93* (2019.01); *G06F 8/65* (2013.01)

(58) Field of Classification Search
CPC .................................. G06F 16/93; G06F 8/65
See application file for complete search history.

(56) References Cited

U.S. PATENT DOCUMENTS

| 2016/0239847 | A1* | 8/2016 | Arvapally | ............ G06Q 30/016 |
| 2017/0337287 | A1  | 11/2017 | Gill | |
| 2019/0102746 | A1* | 4/2019 | Gupta | ................ G06Q 10/1095 |
| 2023/0120174 | A1  | 4/2023 | Seck et al. | |

OTHER PUBLICATIONS

Michael J. Franklin et al., "CrowdDB: Answering Queries with Crowdsourcing," SIGMOD'11, Jun. 12-16, 2011, Athens, Greece (12 pages).
International Search Report and Written Opinion for Application No. PCT/US2024/027026, mailed on Jul. 23, 2024, 10 pages.
Novemberjazz: "Issue tracking system Wikipedia", Aug. 23, 2022 (Aug. 23, 2022), pp. 1-4, XP093184093, Retrieved from the Internet: URL: https://en.wikipedia.org/w/index.php?title=Issue_tracking_system&oldid=1106232167 [retrieved on 2024-07-101 The Whole Document.

* cited by examiner

*Primary Examiner* — Hosain T Alam
*Assistant Examiner* — Anthony G Gemignani
(74) *Attorney, Agent, or Firm* — Harrity & Harrity, LLP

(57) ABSTRACT

In some implementations, an instruction management system may receive, from a plurality of user devices, a set of feedback associated with the instruction document. The instruction management system may identify a compliance activity associated with the instruction document and identify at least one location in the instruction document based on the set of feedback. The instruction management system may trigger an instruction to a tracking system to open a ticket associated with the compliance activity and the at least one location.

20 Claims, 13 Drawing Sheets

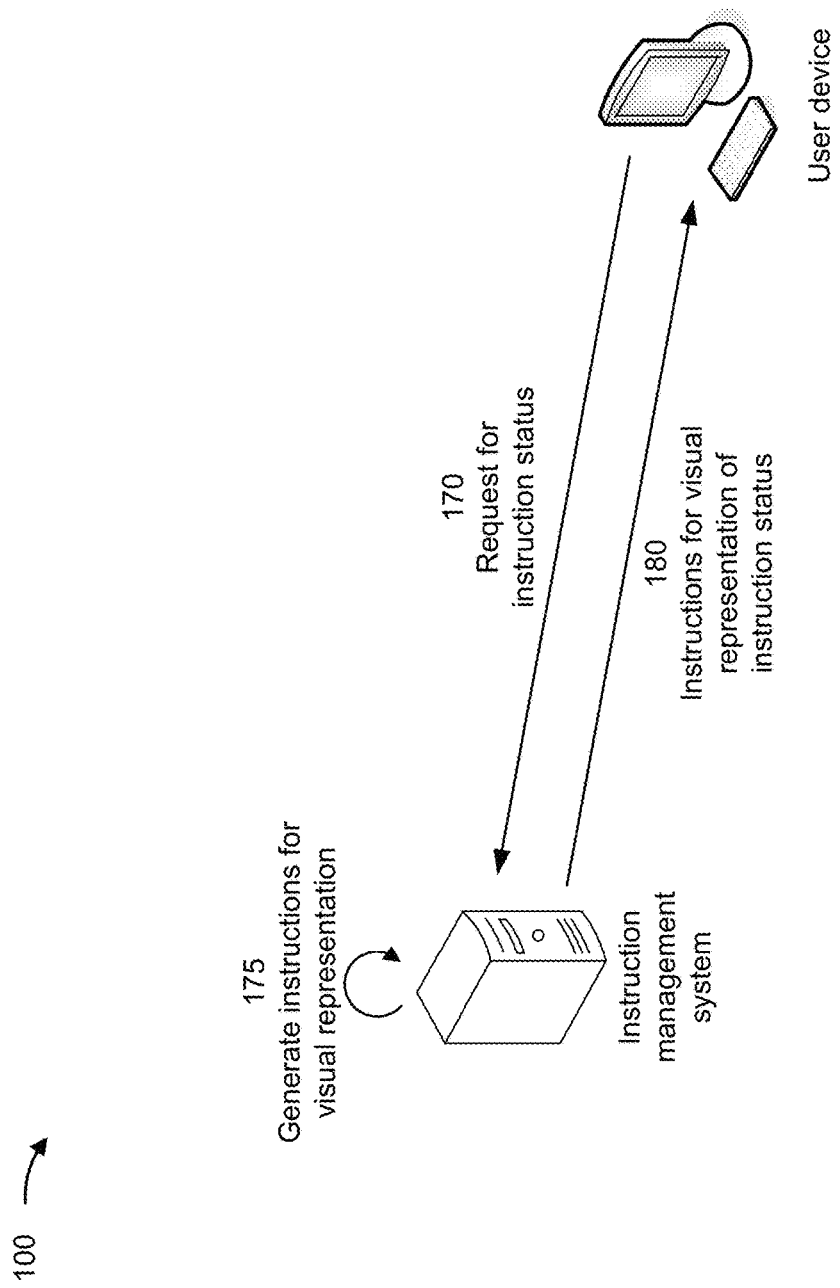

| Rule | Description | Impacted Level | Task Owner | Non-compliance Impact | Story Count | Due Date | LoE | RoA | Office Hours | Support Channel | Instructions Template | Instructions Status |
|---|---|---|---|---|---|---|---|---|---|---|---|---|
| TIR | Review... | TIR Team | TIR Team Certifier | Prime | 12 | 30 days | 1.75 hrs | 1 hr saved | ⊘ | ⋮⋮ | From owner | Updated ◎ |
| TIR | Apply... | App component | Engineering Lead | VP escalation | 1 | 15 days | 1 hr | 3 hrs saved | ⊘ | ⋮⋮ | From owner | Updated ◎ |
| UTEP | Generate... | ASV | Engineering Lead | Regulators | 3 | Overdue | 5 hrs | 7 hrs saved | ⊘ | ⋮⋮ | From owner | Not updated ● |
| UTEP | Generate... | ASV | Engineering Lead | Prime | 1 | 15 days | 1 hr | 1 hr saved | ⊘ | ⋮⋮ | From owner | Updating ◉ |
| AMI rehydration | Inform... | App component | Engineering Lead | Toc Bridge | 2 | 15 days | 4 hrs | 5 hrs saved | ⊘ | ⋮⋮ | From owner | Updated ◎ |
| Non-Par test strategy | Document... | TIR Team | Engineering Lead | VP escalation | 1 | 15 days | 6 hrs | 3 hrs saved | ⊘ | ⋮⋮ | From owner | Updated ◎ |
| CI/CD onboarding | Application... | TIR Team | Engineering Lead | Prime | 3 | Overdue | 3 hrs | 1 hr saved | ⊘ | ⋮⋮ | From owner | Updated ◎ |
| UTEP | Generate... | ASV | Engineering Lead | Prime | 2 | 15 days | 1 hr | 1 hr saved | ⊘ | ⋮⋮ | From owner | Updated ◎ |
| UTEP | Generate... | ASV | Engineering Lead | VP escalation | 3 | 15 days | 7.25 hrs | 3 hrs saved | ⊘ | ⋮⋮ | From owner | Not Updated ● |
| AMI rehydration | Inform... | App component | Engineering Lead | Toc Bridge | 1 | 15 days | 1 hr | 5 hrs saved | ⊘ | ⋮⋮ | From owner | Updating ◉ |
| Non-Par test strategy | Document... | TIR Team | Engineering Lead | Prime | 1 | 15 days | 2.5 hrs | 1 hr saved | ⊘ | ⋮⋮ | From owner | Updating ◉ |
| CI/CD onboarding | Application... | TIR Team | Engineering Lead | VP escalation | 3 | 15 days | 1 hr | 3 hrs saved | ⊘ | ⋮⋮ | From owner | Updated ◎ |

FIG. 2

AUTOMATIC UPDATES TO INSTRUCTION DOCUMENTS USING CROWDSOURCING

BACKGROUND

Instruction documents abound, both in physical form and in digital form. For example, furniture often includes a corresponding instruction booklet that describes assembly steps for a user to follow. In another example, a software program may have a corresponding instruction document (sometimes referred to as a "README" file) that describes steps for the user to follow for setup and use of the software program.

SUMMARY

Some implementations described herein relate to a system for triggering updates to an instruction document with crowdsourcing. The system may include one or more memories and one or more processors communicatively coupled to the one or more memories. The one or more processors may be configured to receive, from a plurality of user devices, a set of feedback associated with a compliance activity. The one or more processors may be configured to identify the instruction document based on the compliance activity. The one or more processors may be configured to perform clustering on the set of feedback to identify at least one location in the instruction document. The one or more processors may be configured to trigger an instruction to a tracking system to open a ticket associated with the at least one location. The one or more processors may be configured to transmit instructions for a visual representation of the compliance activity that includes a visual indicator associated with a status of the ticket.

Some implementations described herein relate to a method of triggering updates to an instruction document with crowdsourcing. The method may include receiving, from a plurality of user devices, a set of feedback associated with the instruction document. The method may include identifying a compliance activity associated with the instruction document. The method may include identifying at least one location in the instruction document based on the set of feedback. The method may include triggering an instruction to a tracking system to open a ticket associated with the compliance activity and the at least one location.

Some implementations described herein relate to a non-transitory computer-readable medium that stores a set of instructions for triggering updates to an instruction document with crowdsourcing. The set of instructions, when executed by one or more processors of a device, may cause the device to receive, from a plurality of user devices, a set of feedback associated with the instruction document. The set of instructions, when executed by one or more processors of the device, may cause the device to perform clustering on the set of feedback to identify at least one location in the instruction document. The set of instructions, when executed by one or more processors of the device, may cause the device to transmit instructions for a visual representation that includes a visual indicator associated with the at least one location.

BRIEF DESCRIPTION OF THE DRAWINGS

FIGS. 1A-1G are diagrams of an example implementation relating to automatic updates to instruction documents using crowdsourcing, in accordance with some embodiments of the present disclosure.

FIG. 2 is a diagram of an example user interface associated with statuses for instruction documents, in accordance with some embodiments of the present disclosure.

DETAILED DESCRIPTION

The following detailed description of example implementations refers to the accompanying drawings. The same reference numbers in different drawings may identify the same or similar elements.

Instruction documents may include physical booklets (e.g., describing assembly steps for a user to follow) and digital documents (e.g., describing steps for the user to follow for setup and use of a software program). In some situations, however, users may encounter difficulty in following a portion of an instruction document. For example, wording in the instruction document may be confusing, labels in the instruction document may be out-of-date, and/or diagrams in the instruction document may be unclear, among other examples.

The users may provide feedback on the instruction document. However, sifting through feedback from multiple users consumes power and processing resources. For example, scrolling back and forth within feedback or switching between feedback from different users, especially over and over again, consumes a lot of power and processing resources. Aggregating the feedback into a single document conserves some power and processing resources and also increases memory overhead. Additionally, aggregating the feedback may inadvertently trigger an administrator to update a portion of the instruction document that was only misunderstood by one or two users, thereby wasting power and processing resources on the update.

Some implementations described herein enable identification of relevant locations in an instruction document based on feedback from multiple users. As a result, power and processing resources are conserved that otherwise would have been wasted on sifting through the feedback. Additionally, memory overhead is conserved as compared with aggregating the feedback, and an administrator is less likely to update a portion of the instruction document that was only misunderstood by one or two users and thereby less likely to waste power and processing resources. Additionally, some implementations described herein enable automatic creation of a ticket instructing the user to update the instruction document in the relevant locations that were identified. As a result, network resources are conserved that otherwise would have been consumed by multiple messages between a user device and a tracking system in order to generate the ticket.

FIGS. 1A-1G are diagrams of an example 100 associated with automatic updates to instruction documents using crowdsourcing. As shown in FIGS. 1A-1G, example 100 includes an instruction management system, user devices, and a tracking system. These devices are described in more detail in connection with FIGS. 4 and 5.

Figure 1A:
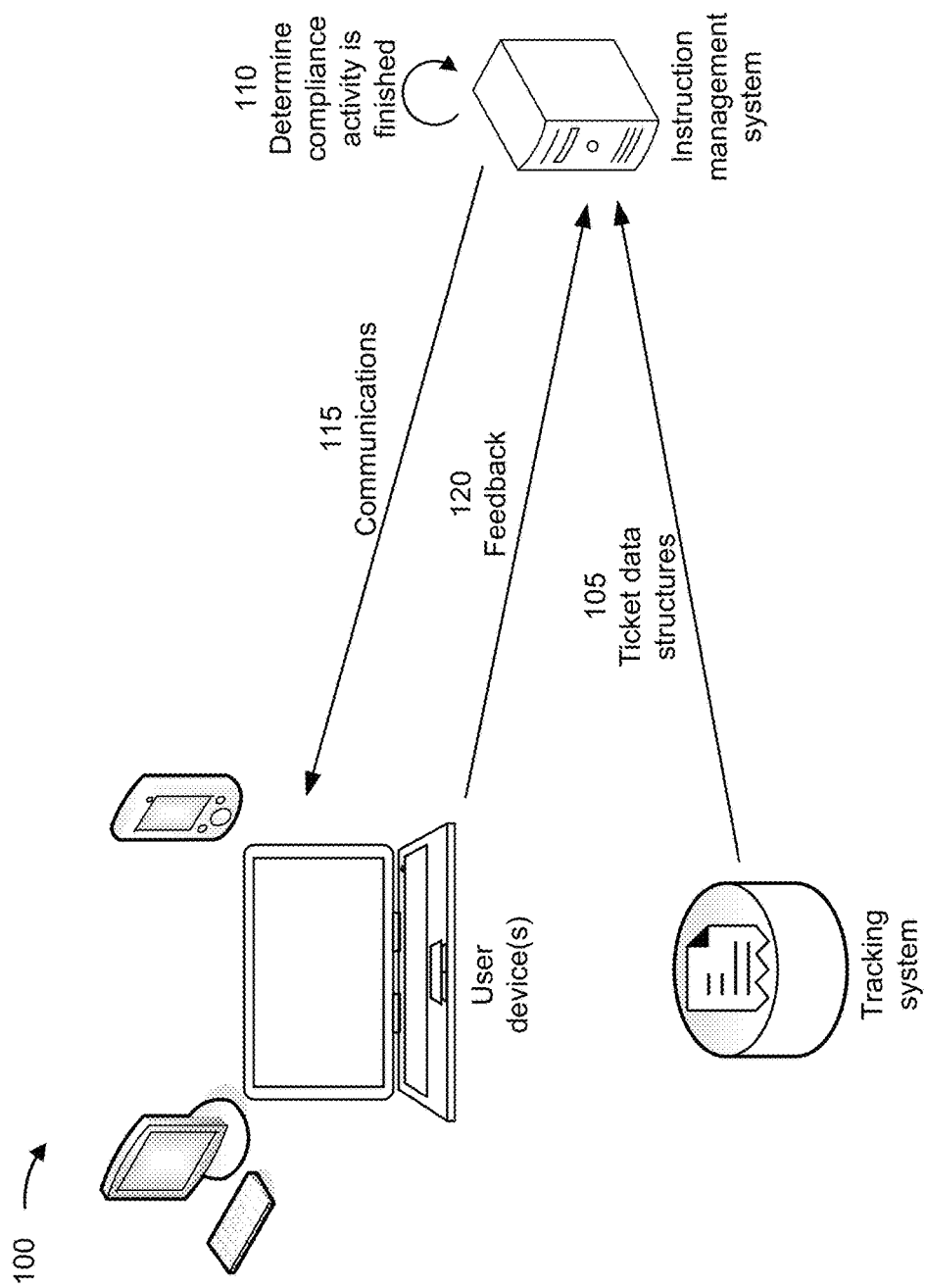

As shown in FIG. 1A and by reference number 105, the tracking system may transmit, and the instruction management system may receive, data structures (e.g., at least one data structure) representing a ticket (e.g., at least one ticket) associated with a compliance activity (e.g., at least one compliance activity). Compliance activities may include certification of a set of team members, rehydration of a cloud storage, updating of a software application, review of an application profile review, or registering a dataset, among other examples. In some implementations, the tickets may be generated in response to non-completion of the compliance activities (e.g., automatically or by an administrator). Alternatively, the tickets may be generated as reminders to complete the compliance activities (e.g., automatically or by the administrator).

In some implementations, the instruction management system may transmit, and the tracking system may receive, a request for the data structures. For example, the request may include a hypertext transfer protocol (HTTP) request and/or an application programming interface (API) call, among other examples. The request may include (e.g., in a header and/or as an argument) an indication of the compliance activity. Accordingly, the tracking system may transmit the data structures in response to the request. The instruction management system may transmit the request according to a schedule (e.g., once per hour or once per day, among other examples) and/or in response to a command to transmit the request. For example, a user device (e.g., associated with the administrator or another type of user) may transmit, and the instruction management system may receive, the command, such that the instruction management system transmits the request in response to the command.

Additionally, or alternatively, the instruction management system may subscribe to ticket updates from the tracking system. Accordingly, the tracking system may transmit the data structures according to a schedule (e.g., once per hour or once per day, among other examples) and/or as available (e.g., shortly after new tickets are created and/or existing tickets are modified).

As shown by reference number 110, the instruction management system may determine that the compliance activity is finished. For example, the instruction management system may extract indicators (e.g., one or more indicators), such as Boolean indicators or another type of binary indicator, from the data structures that indicate that the compliance activity is finished. Additionally, or alternatively, the tracking system may transmit, and the instruction management system may receive, an update (e.g., one or more updates) to the data structures, which indicates that the compliance activity is finished.

Although the example 100 is described with the instruction management system determining that the compliance activity is finished, other examples may include the tracking system indicating to the instruction management system that the compliance activity is finished. For example, the tracking system may transmit an indication that the compliance activity is finished in addition to, or in lieu of, the data structures.

As shown by reference number 115, the instruction management system may transmit communications (e.g., a plurality of communications) to the user devices. The instruction management system may transmit the communications based on the compliance activity being finished (e.g., in response to an indication that the compliance activity is finished, whether determined or received, as described above). The communications may include email messages, text messages, and/or other types of messages transmitted to the user devices. Accordingly, in some implementations, the instruction management system may transmit the communications to a communication manager (e.g., an email server, a cellular network device, and/or another type of network device) with instructions to forward the communications to the user devices.

In some implementations, the instruction management system may use a database (e.g., a relational database, such as a look-up table (LUT), or another type of database) to determine the communication manager (or managers) to use to transmit the communications. For example, the instruction management system may extract user identifiers (e.g., names, usernames, and/or other types of identifiers) from the data structures and perform a query on the database (e.g., a structured query language (SQL) query for a relational database or another type of query for a NoSQL database) to identify the communication manager(s) to use. Therefore, the database may store user identifiers in association with email addresses, phone numbers, and/or other types of indications of the communication manager(s) to use. The database may be local to the instruction management system (e.g., stored in a memory managed by the instruction management system). Alternatively, the database may be at least partially external (e.g., physically, logically, and/or virtually) from the instruction management system. Therefore, the instruction management system may transmit the query to the database (e.g., included in an HTTP request and/or using an API call) and receive a response to the query (e.g., included in an HTTP response and/or as a return from the API call).

As shown by reference number 120, the user devices may transmit, and the instruction management system may receive, a set of feedback associated with an instruction document for the compliance activity. The set of feedback may include a rating (e.g., an overall rating for the instruction document and/or ratings corresponding to portions of the instruction document) and/or comments associated with the instruction document (e.g., one or more strings encoding text entered by users of the user devices). In some implementations, the users of the user devices may interact with a user interface (UI) (e.g., via a keyboard, a mouse, a touchscreen, or another type of input component) and trigger the user devices to transmit the set of feedback in response to the communications.

In some implementations, the user devices may transmit the set of feedback directly in response to the communications. For example, the communications may include text messages (e.g., short message service (SMS) messages and/or multimedia messaging service (MMS) messages, among other examples) such that the user devices transmit text messages, in response to the communications, that encode the set of feedback. Additionally, or alternatively, the user devices may transmit the set of feedback indirectly in response to the communications. For example, the communications may include a link (e.g., a hyperlink to an Internet website) such that the users of the user devices may interact with the link (e.g., via a keyboard, a mouse, a touchscreen, or another type of input component) to trigger the user devices to navigate using the link (e.g., via a web browser or another type of application). Thus, the users of the user devices may interact with the website (e.g., via a keyboard, a mouse, a touchscreen, or another type of input component) to trigger the user devices to transmit the set of feedback.

Figure 1B:
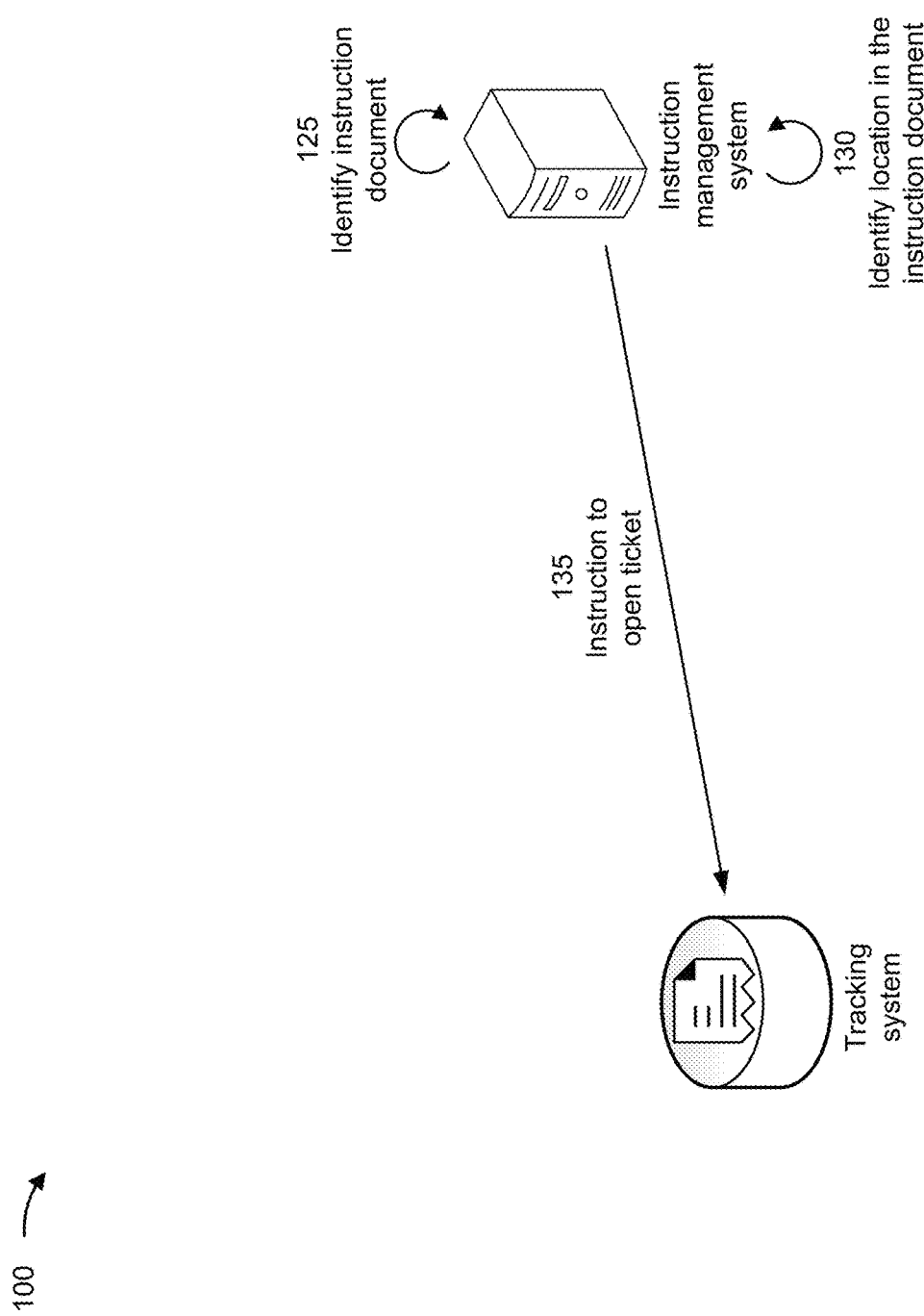

As shown in FIG. 1B and by reference number 125, the instruction management system may identify the instruction document. For example, the instruction document may be associated with an identifier (e.g., a filename, an index, and/or another type of alphanumeric identifier), and the instruction management system may determine the identifier. In some implementations, the instruction management system may identify the instruction document based on the compliance activity. For example, the instruction management system may extract an identifier associated with the compliance activity (e.g., a name, an index, and/or another type of identifier) from the data structures and perform a query on a database (e.g., a SQL query for a relational database or another type of query for a NoSQL database) to identify the instruction document. The database may therefore be used to map identifiers associated with compliance activities to identifiers associated with instruction documents. The database may be local to the instruction management system (e.g., stored in a memory managed by the instruction management system). Alternatively, the database may be at least partially external (e.g., physically, logically, and/or virtually) from the instruction management system. Therefore, the instruction management system may transmit the query to the database (e.g., included in an HTTP request and/or using an API call) and receive a response to the query (e.g., included in an HTTP response and/or as a return from the API call).

Although the example 100 is described with the instruction management system identifying the instruction document based on the compliance activity, other examples may include the instruction management system identifying the instruction document based on the set of feedback. For example, the instruction management system may extract the identifier associated with the instruction document from the set of feedback. Additionally, or alternatively, the instruction management system may associate the communications, transmitted to the user devices, with the instruction document such that the set of feedback is associated with the instruction document when received.

Additionally, or alternatively, although the example 100 is described with the instruction management system identifying the instruction document based on the compliance activity, other examples may include the instruction management system identifying the compliance activity based on the instruction document. For example, the database may be used to map identifiers associated with instruction documents to identifiers associated with compliance activities. In some implementations, the instruction management system may extract an identifier associated with the compliance activity from the set of feedback. Additionally, or alternatively, the instruction management system may associate the communications, transmitted to the user devices, with the compliance activity such that the set of feedback is associated with the compliance activity when received.

Additionally, or alternatively, although the example 100 is described with the set of feedback being associated with the compliance activity, other examples may include the set of feedback being associated with an instruction document not associated with a compliance activity. For example, the instruction management system may transmit the communications, to the user devices, asking for the set of feedback on an instruction document for a software application (e.g., a mobile app), for furniture, or for another use unassociated with compliance activities. In another example, the instruction management system may receive the set of feedback from a data lake or another type of storage repository (e.g., stored from a previous round of communications sent by the instruction management system or another device that collects feedback from the user devices).

As shown by reference number 130, the instruction management system may identify a location (e.g., at least one location) within the instruction document based on the set of feedback. The location may include a section (and/or a sub-section), such that the instruction management system identifies an indication of the section (e.g., a name, an index, and/or another type of indication). Additionally, or alternatively, the location may include a page number, a paragraph number, and/or a line number. Additionally, or alternatively, the location may be pixel-based (e.g., an identification of a pixel or a region of pixels based on a visually rendered version of the instruction document).

In some implementations, the instruction management system may extract a set of indicators, from the set of feedback, that are associated with the location. For example, as described above, the set of feedback may include ratings associated with portions of the instruction document, such that the instruction management system may determine the location based on mapping one (or more) of the ratings to the location associated with the portion, of the instruction document, associated with that rating (or those ratings). Additionally, or alternatively, the users may expressly include location indicators in the set of feedback (e.g., by interacting with check boxes, radio buttons, and/or other UI elements via the user devices), such that the instruction management system may determine the location by extracting the location indicators from the set of feedback.

Additionally, or alternatively, the instruction management system may use machine learning (e.g., as described in connection with FIGS. 3A-3B) to identify the location. For example, the instruction management system may perform clustering (e.g., as described in connection with FIG. 3B) on the set of feedback to identify the location in the instruction document. The clustering may be according to semantic similarities. For example, the instruction management system may cluster the feedback to determine that negative words (e.g., "confusing," "difficult," and/or "hard," among other examples) in a cluster, of the set of feedback, tend to be near characters that identify the location (e.g., a section title, a page number, and/or a paragraph number, among other examples).

Although the example 100 is described with the instruction management system using the set of feedback to identify the location, other examples may additionally or alternatively include the instruction management system using the data structures to identify the location. For example, the data structures may indicate sequences of actions performed by the users (e.g., sequences of commands transmitted by the user devices in order to perform the compliance activity) with corresponding timestamps for the actions. Accordingly, the instruction management system may identify an action (e.g., one or more actions) in the sequences that is associated with a longest amount of time (based on adjacent timestamps) and/or an amount of time that satisfies a threshold (e.g., a threshold based on an expected amount of time for the action). Therefore, the instruction management system may identify the location based on the identified action. In some implementations, the instruction management system may identify the location using a database. For example, the instruction management system may query the database (e.g., using SQL for a relational database or a different type of query for a NoSQL database) to determine locations associated with different actions. Accordingly, the instruction management system may determine the location by mapping locations in the database to actions in the sequences (e.g., as indicated in the data structures). The database may be local to the instruction management system (e.g., stored in a memory managed by the instruction management system). Alternatively, the database may be at least partially external (e.g., physically, logically, and/or virtually) from the instruction management system. Therefore, the instruction management system may transmit the query to the database (e.g., included in an HTTP request and/or using an API call) and receive a response to the query (e.g., included in an HTTP response and/or as a return from the API call).

As shown by reference number 135, the instruction management system may trigger an instruction, to the tracking system, to open a ticket associated with the location. For example, the instruction may include an indication of the location (e.g., a section number, a section name, a sub-section name, a sub-section number, a page number, a paragraph number, a line number, and/or a pixel-based indication, among other examples). Because the instruction management system creates the ticket with the instruction, network resources are conserved that otherwise would have been consumed by multiple messages between a user device (e.g., associated with the administrator or another user responsible for the instruction document) and the tracking system in order to generate the ticket. The ticket may further be associated with the compliance activity (e.g., including a name and/or another identifier associated with the compliance activity) and/or the instruction document (e.g., including a name and/or another identifier associated with the instruction document).

In some implementations, the instruction management system may determine to open the ticket, associated with the location, based on the set of feedback satisfying a condition. For example, the instruction management system may trigger the instruction in response to a quantity of negative feedback associated with the location satisfying a triggering threshold. Additionally, or alternatively, the instruction management system may trigger the instruction in response to a sentiment measurement (e.g., associated with negativity), associated with the set of feedback and associated with the location, satisfying a sentiment threshold. Because the instruction management system identifies the location, power and processing resources are conserved that otherwise would have been wasted on sifting through the set of feedback. Additionally, the ticket being associated with the location makes the administrator (or other user responsible for the instruction document) less likely to update a portion of the instruction document that was only confusing to a handful of users, thereby conserving power and processing resources that would have been wasted on the update.

In some implementations, the instruction management system may select extracts (e.g., one or more extracts) from the set of feedback to associate with the ticket. For example, the instruction management system may extract phrases and/or sentences from the set of feedback that are near (e.g., within a threshold quantity of characters and/or words) negative words associated with the location. Accordingly, the instruction management system may include the extracts in the instruction so that the ticket indicates the extracts to guide the administrator (or other user responsible for the instruction document) in updating the instruction document.

Although the instruction management system is described as transmitting the extracts with the instruction to open the ticket, other examples may include the instruction management system transmitting the extracts separately from the instruction to open the ticket. For example, the instruction management system may transmit a command to update the ticket and include the extracts in the command. In another example, the tracking system may transmit a request for updates to the instruction management system, and the instruction management system may transmit the extracts in response to the request for updates.

Figure 1C:
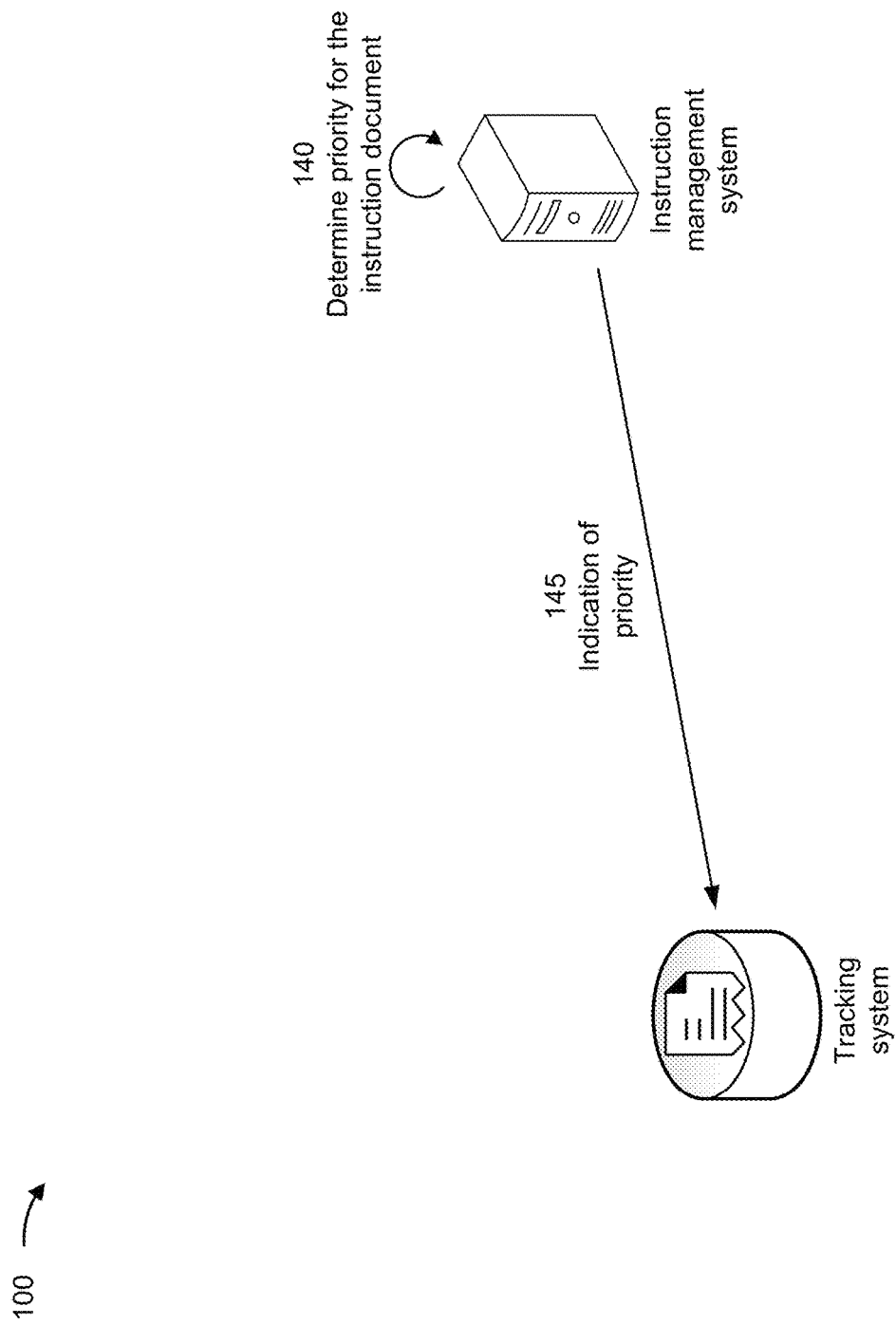

In some implementations, as shown in FIG. 1C and by reference number 140, the instruction management system may determine a priority level associated with the instruction document. For example, the instruction management system may identify the compliance activity associated with the instruction document (e.g., based on the compliance activity associated with the data structures) and may determine a priority level associated with the compliance activity. In some implementations, the instruction management system may identify the priority level using a database. For example, the instruction management system may query the database (e.g., using SQL for a relational database or a different type of query for a NoSQL database) to determine priority levels associated with compliance activities. Accordingly, the instruction management system may determine the priority level by mapping priority levels in the database to compliance activities (e.g., associated with the data structures). The database may be local to the instruction management system (e.g., stored in a memory managed by the instruction management system). Alternatively, the database may be at least partially external (e.g., physically, logically, and/or virtually) from the instruction management system. Therefore, the instruction management system may transmit the query to the database (e.g., included in an HTTP request and/or using an API call) and receive a response to the query (e.g., included in an HTTP response and/or as a return from the API call).

Accordingly, as shown by reference number 145, the instruction management system may transmit, and the tracking system may receive, an indication of the priority level. For example, the instruction management system may transmit a command to update the ticket and include the priority level in the command. In another example, the tracking system may transmit a request for updates to the instruction management system, and the instruction management system may transmit the priority level in response to the request for updates.

Although the example 100 includes the instruction management system transmitting the indication of the priority level separately from the instruction to open the ticket, other examples may include the instruction management system indicating the priority in the instruction to open the ticket. Additionally, or alternatively, although the example 100 includes the priority level being associated with the compliance activity, other examples may include the priority level being associated with the instruction document and/or the location. For example, the instruction management system may query a database (e.g., using SQL for a relational database or a different type of query for a NoSQL database) to determine priority levels associated with instruction documents (and/or locations within instruction documents). Accordingly, the instruction management system may determine the priority level by mapping priority levels in the database to instruction documents (and/or locations therein). The database may be local to the instruction management system (e.g., stored in a memory managed by the instruction management system). Alternatively, the database may be at least partially external (e.g., physically, logically, and/or virtually) from the instruction management system. Therefore, the instruction management system may transmit the query to the database (e.g., included in an HTTP request and/or using an API call) and receive a response to the query (e.g., included in an HTTP response and/or as a return from the API call).

Figure 1D:
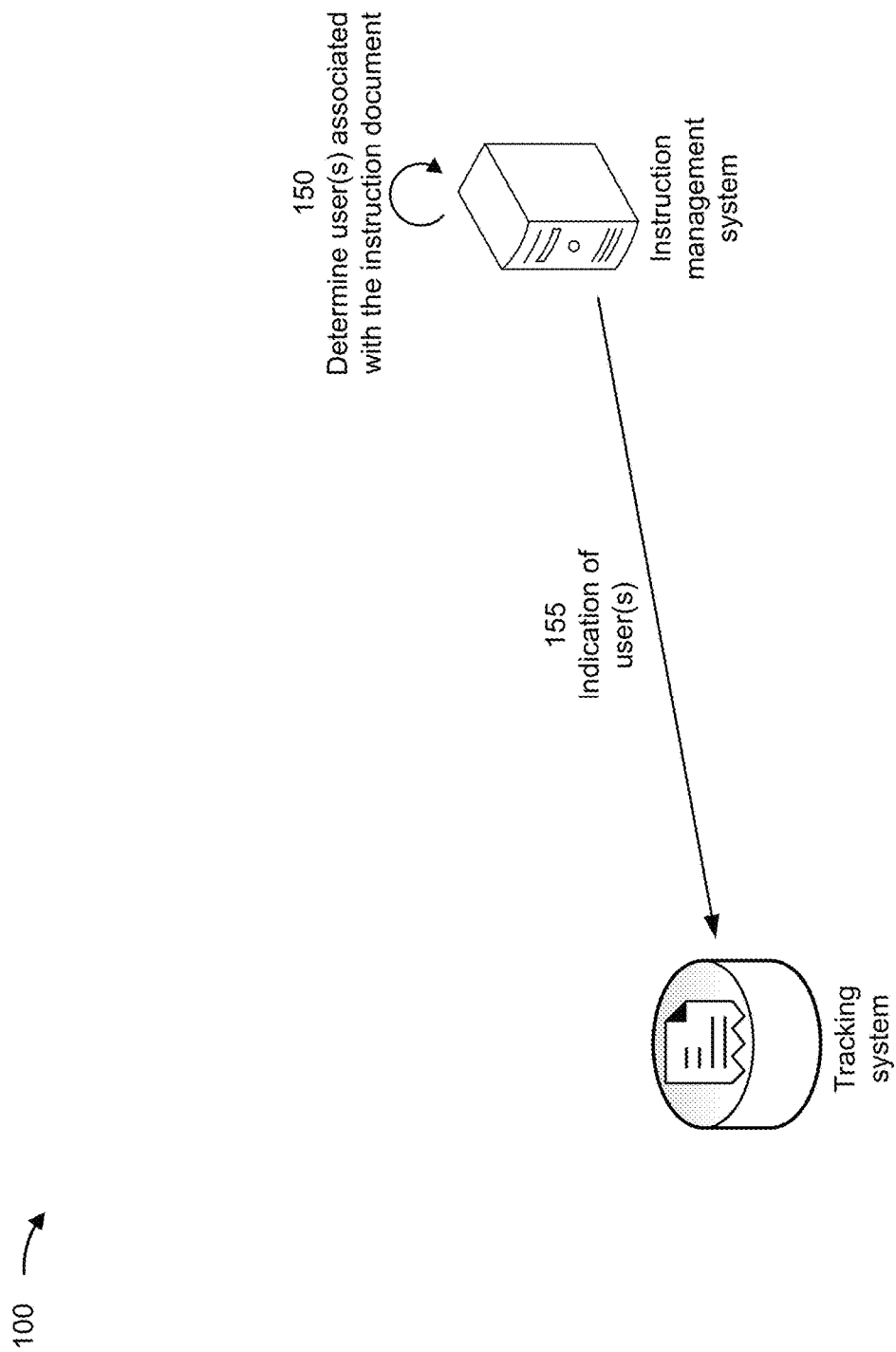

Additionally, or alternatively, as shown in FIG. 1D and by reference number 150, the instruction management system may determine one or more users (e.g., a set of users) associated with the instruction document. For example, the instruction management system may identify the users using a database. The instruction management system may query the database (e.g., using SQL for a relational database or a different type of query for a NoSQL database) to determine users associated with instruction documents. Accordingly, the instruction management system may determine the user (s) by mapping identifiers of users (e.g., names, usernames, email address, and/or other identifiers) in the database to identifiers of instruction documents (e.g., filenames, indices, and/or other alphanumeric identifiers). The database may be local to the instruction management system (e.g., stored in a memory managed by the instruction management system). Alternatively, the database may be at least partially external (e.g., physically, logically, and/or virtually) from the instruction management system. Therefore, the instruction management system may transmit the query to the database (e.g., included in an HTTP request and/or using an API call) and receive a response to the query (e.g., included in an HTTP response and/or as a return from the API call).

Accordingly, as shown by reference number 155, the instruction management system may transmit, and the tracking system may receive, an indication of the user(s). For example, the instruction management system may transmit a command to update the ticket and include the indication of the user(s) in the command. In another example, the tracking system may transmit a request for updates to the instruction management system, and the instruction management system may transmit the indication of the user(s) in response to the request for updates.

Although the example 100 includes the instruction management system transmitting the indication of the user(s) separately from the instruction to open the ticket, other examples may include the instruction management system indicating the user(s) in the instruction to open the ticket.

Figure 1E:
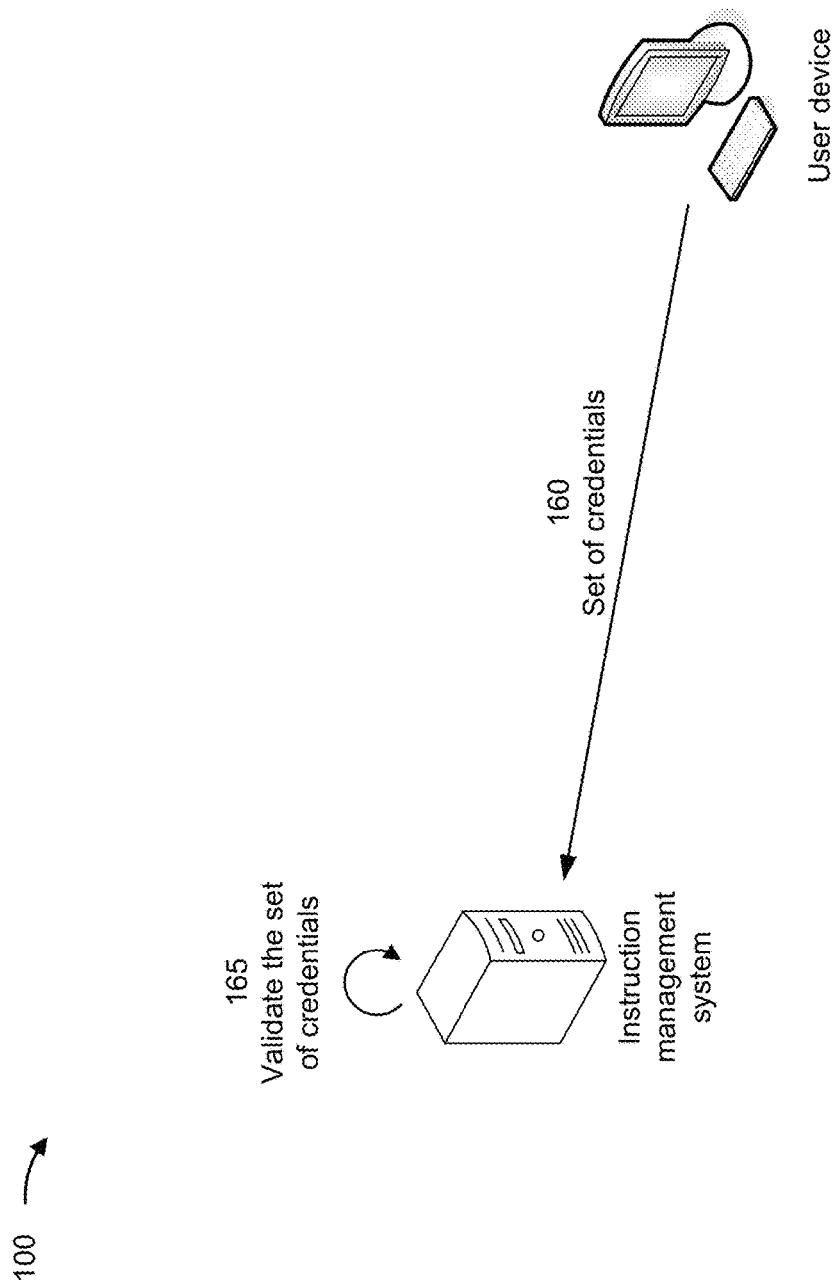

In some implementations, as shown in FIG. 1E and by reference number 160, a user device (e.g., associated with the administrator or a user responsible for the instruction document, such as a user associated with the ticket) may transmit, and the instruction management system may receive, a set of credentials associated with the administrator (or other user responsible for the instruction document). The set of credentials may include a username and password, a passcode, a secret answer, a certificate, and/or biometric information, among other examples. Accordingly, as shown by reference number 165, the instruction management system may validate the set of credentials. For example, the instruction management system may confirm that the administrator (or other user responsible for the instruction document) is authorized to view the ticket.

As shown in FIG. 1F and by reference number 170, the user device (e.g., associated with the administrator or another user responsible for the instruction document) may transmit, and the instruction management system may receive, a request for a status associated with the instruction document. In some implementations, the administrator may interact with a UI (e.g., via a keyboard, a mouse, a touch-screen, or another type of input component) to trigger the user device to transmit the request. For example, the user may perform a left click, a tap, push an enter key, speak an audio command, or otherwise interact with the UI.

As shown by reference number 175, the instruction management system may generate instructions for a visual representation that includes a visual indicator associated with the location. In some implementations, the visual representation may include a tabular representation of the compliance activity in association with the visual indicator. Additionally, or alternatively, the visual representation may include a visual indicator associated with the status of the ticket. In some implementations, as described in connection with FIG. 2, the tabular representation may show the status of the ticket in association with the compliance activity. Additionally, or alternatively, the visual representation may include a visual indicator associated with the priority level associated with the ticket. In some implementations, the tabular representation may show the priority level in association with the compliance activity.

In some implementations, the priority level may be based on a due date (e.g., associated with the compliance activity) and an impact (e.g., associated with a failure of the compliance activity). The due date may be extracted from the data structures and/or determined using a database (e.g., as described herein). Similarly, the impact may be extracted from the data structures and/or determined using a database (e.g., as described herein). Although the visual representation is described in connection with the compliance activity, the visual representation may alternatively show the visual indicator(s) described herein in connection with the instruction document (e.g., when the instruction document is unassociated with a compliance activity).

In some implementations, the instruction management system may determine to include the visual indicator associated with the location based on the set of feedback satisfying a condition. For example, the instruction management system may include the visual indicator in the visual representation in response to a quantity of negative feedback associated with the location satisfying a triggering threshold. Additionally, or alternatively, the instruction management system may include the visual indicator in the visual representation in response to a sentiment measurement (e.g., associated with negativity), associated with the set of feedback and associated with the location, satisfying a sentiment threshold.

As shown by reference number 180, the instruction management system may transmit, and the user device may receive, the instructions for the visual representation. Accordingly, the user device may show or otherwise output a UI based on the instructions (e.g., via a display, a speaker, or another type of output component). Although the example 100 is described in connection with the visual representation, other examples may include the instruction management system outputting the location, the status of the ticket, and/or the priority level to the user device as text or another non-visual data type.

Although the example 100 is described with the request for the status being separate from the set of credentials, other examples may include the user device including the set of credentials and the request in a same message.

Figure 1G:
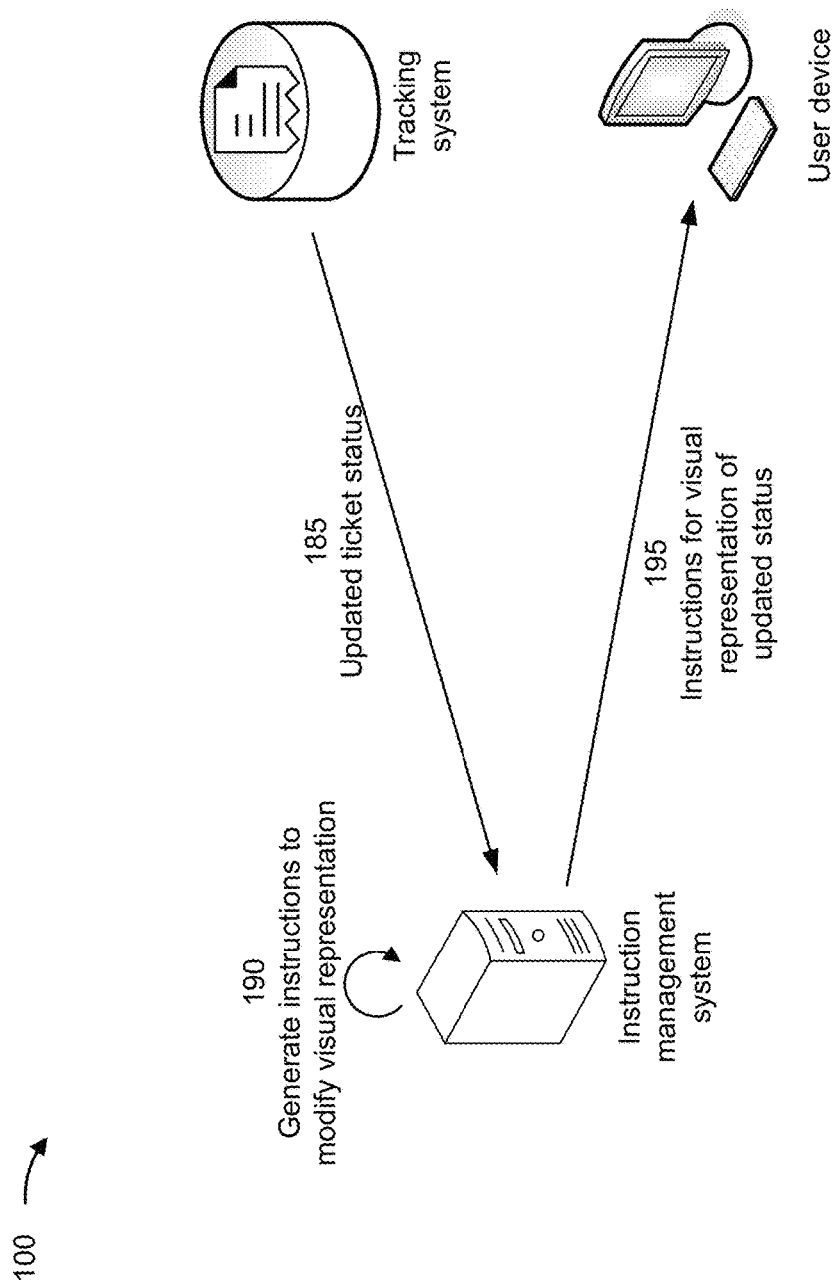

As shown in FIG. 1G and by reference number 185, the tracking system may transmit, and the instruction management system may receive, an updated status of the ticket. In some implementations, the instruction management system may transmit, and the tracking system may receive, a request associated with the ticket. For example, the request may include an HTTP request and/or an API call, among other examples. The request may include (e.g., in a header and/or as an argument) an indication of the ticket. Accordingly, the tracking system may transmit the updated status in response to the request. The instruction management system may transmit the request according to a schedule (e.g., once per hour or once per day, among other examples) and/or in response to a command to transmit the request. For example, the user device may transmit, and the instruction management system may receive, the command, such that the instruction management system transmits the request in response to the command.

Additionally, or alternatively, the instruction management system may subscribe to ticket updates from the tracking system. Accordingly, the tracking system may transmit the updated status according to a schedule (e.g., once per hour or once per day, among other examples) and/or as available (e.g., shortly after the ticket is updated).

Accordingly, as shown by reference number 190, the instruction management system may generate instructions to update the visual representation. For example, the instruction management system may generate instructions for an updated visual indicator associated with the updated status of the ticket. As shown by reference number 195, the instruction management system may transmit, and the user device may receive, the instructions for the updated visual indicator. Accordingly, the user device may show or otherwise output a UI based on the instructions (e.g., via a display, a speaker, or another type of output component). Although the example 100 is described in connection with updating the visual indication, other examples may include the instruction management system outputting the updated status of the ticket to the user device as text or another non-visual data type.

Additionally, or alternatively, the instruction management system may receive (e.g., from the tracking system, from a storage including the instruction document, and/or from a user device associated with a user updating the instruction document) a status associated with the instruction document. For example, the status may indicate whether the instruction document is being edited or has been updated according to the ticket. Accordingly, the instruction management system may generate instructions to modify the visual representation (e.g., as described above) with a visual indicator associated with the status of the instruction document.

In some implementations, when the tracking system indicates that the ticket is resolved, the instruction management system may archive the set of feedback in response. As a result, the instruction management system increases accuracy of locations determined for future feedback because resolved feedback does not influence the determination of the locations. In some implementations, to reduce memory overhead, the instruction management system may discard the set of feedback in response to the indication that the ticket is resolved.

In some implementations, the instruction management system may transmit, and a regulator device (e.g., a user device associated with a regulator) may receive, a report indicating the compliance activity. The report may additionally include, in some implementations, a copy of the instruction document (e.g., after editing or updating, as described above) associated with the compliance activity. The regulator device may be associated with a user that oversees compliance activities, whether internal to an organization associated with the compliance activity or external to the organization (e.g., within a government agency or an independent oversight body).

By using techniques as described in connection with FIGS. 1A-1G, the instruction management system identifies the location in the instruction document based on the set of feedback. As a result, power and processing resources are conserved that otherwise would have been wasted on sifting through the set of feedback, and memory overhead is conserved as compared with aggregating the set of feedback for presentation to the administrator (or other user responsible for the instruction document). Additionally, the administrator is less likely to update a portion of the instruction document that was confusing to only a few users and thereby is less likely to waste power and processing resources in doing so.

As indicated above, FIGS. 1A-1G are provided as an example. Other examples may differ from what is described with regard to FIGS. 1A-1G.

FIG. 2 is a diagram of an example UI 200 associated with statuses for instruction documents. The example UI 200 may be shown by a user device (e.g., based on instructions from an instruction management system). These devices are described in more detail in connection with FIGS. 4 and 5.

As shown by reference number 202, the example UI 200 may indicate different categories of compliance activity. For example, the categories in FIG. 2 are types of compliance activities, such as types of technology information risk (TIR) compliance activities, types of unified technology exceptions program (UTEP) compliance activities, Amazon® machine images (AMI) compliance activities, non-parametric (non-par) test compliance activities, and continuous integration and continuous delivery (CI/CD) compliance activities, among other examples. As further shown in FIG. 2, the compliance activities may be associated with application services (ASVs) or other cloud-based applications (e.g., TIR teams or application (app) components, among other examples).

As shown by reference number 204, the example UI 200 may include indications of instruction documents corresponding to the categories of compliance activities. In FIG. 2, the "From owner" text may indicate that an owner of a compliance activity category (e.g., a user associated with ownership of the compliance activities in the category) provided the instruction document for the category.

As shown by reference number 206, the example UI 200 may further indicate statuses associated with the instruction documents. In FIG. 2, the "Updated" text may indicate that the ticket associated with the instruction document for the compliance activity category is complete. On the other hand, the "Not updated" text may indicate that the ticket is incomplete, and the "Updating" text may indicate that the ticket is in progress. As further shown by reference number 206, the statuses may be additionally or alternatively indicated using colors. For example, the shaded circles in the example UI 200 may be patterned (and/or colored) to distinguish different statuses indicated therein.

As indicated above, FIG. 2 is provided as an example. Other examples may differ from what is described with regard to FIG. 2.

Figure 3A:
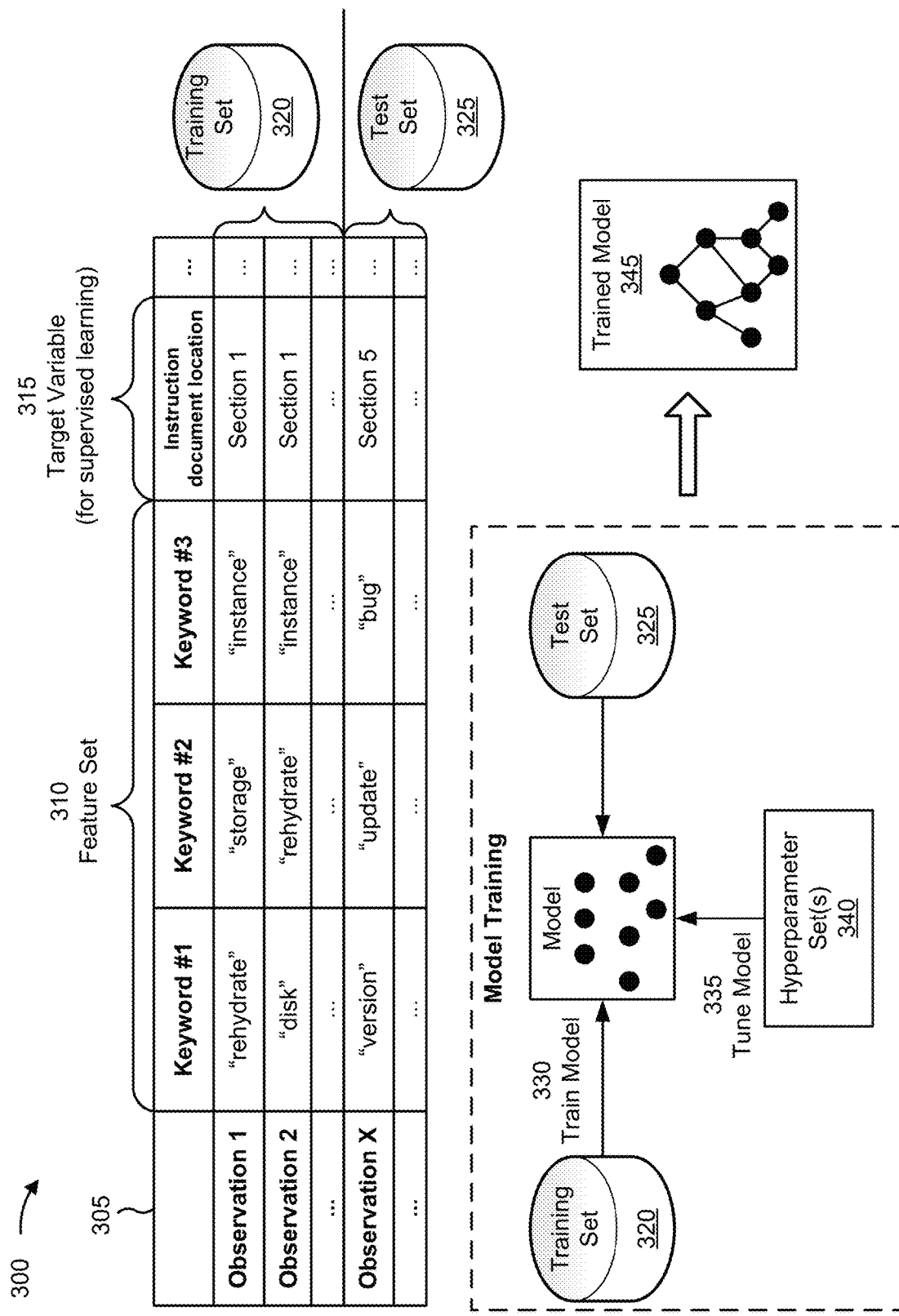
FIGS. 3A-3B are diagrams illustrating an example of training and using a machine learning model, in accordance with some embodiments of the present disclosure.
Figure 3B:
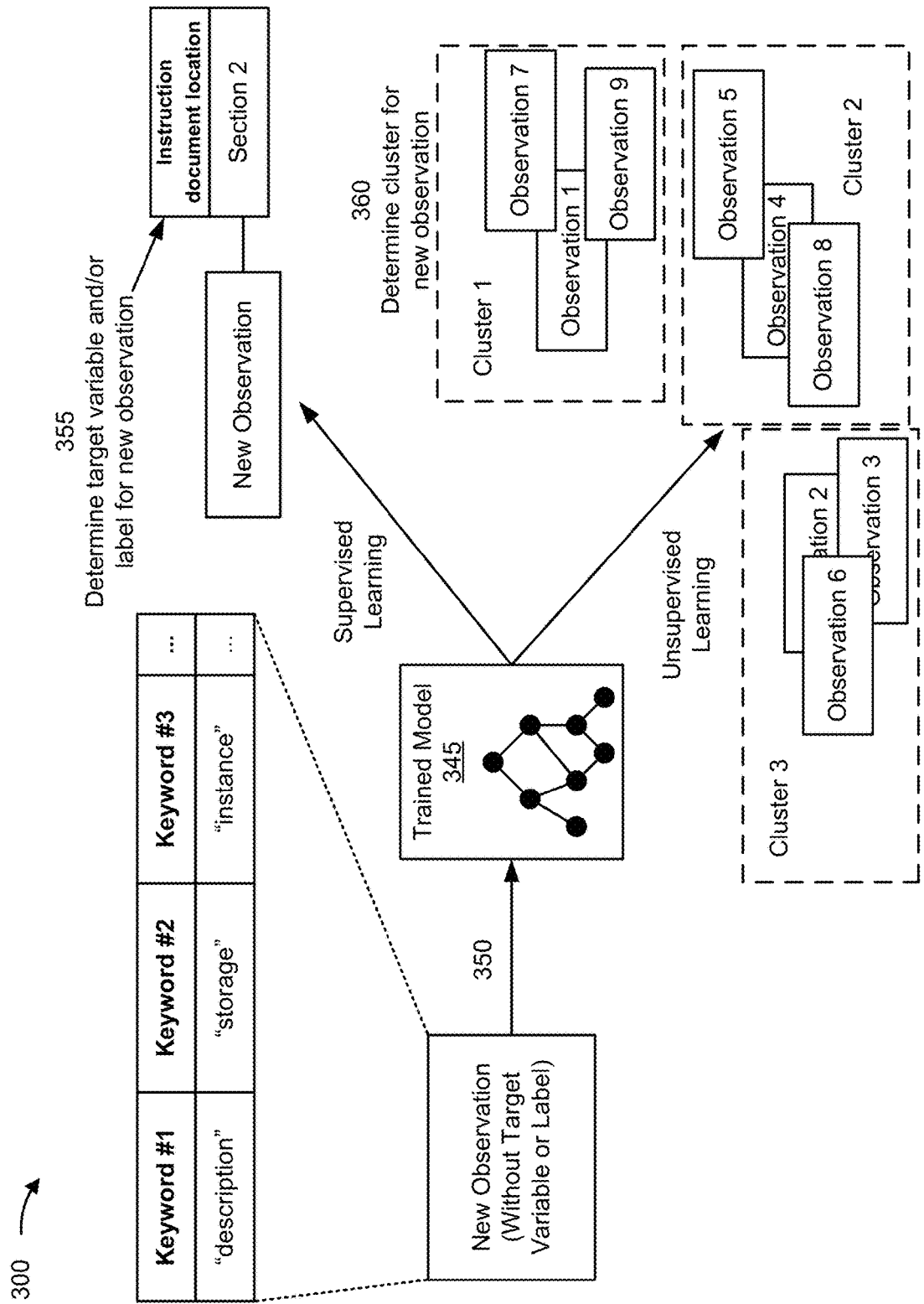

FIGS. 3A and 3B are diagrams illustrating an example 300 of training and using a machine learning model in connection with automatic updates to instruction documents using crowdsourcing. The machine learning model training described herein may be performed using a machine learning system. The machine learning system may include or may be included in a computing device, a server, a cloud computing environment, or the like, such as the instruction management system described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from user devices, as described elsewhere herein. In some implementations, the machine learning system may receive the set of observations (e.g., as input) from the user devices.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the user devices. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a first keyword, a second feature of a second keyword, a third feature of a third keyword, and so on. As shown, for a first observation, the first feature may have a value of "rehydrate," the second feature may have a value of "disk," the third feature may have a value of "version," and so on. These features and feature values are provided as examples, and may differ in other examples. For example, the feature set may include one or more of the following features: a sentiment measurement associated with feedback, a rating indicated in the feedback, and/or a location indicated in the feedback, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a section number, which has a value of 1 for the first observation.

The feature set and target variable described above are provided as examples, and other examples may differ from what is described above. For example, the target variable may include a section name, a sub-section name, a sub-section number, a page number, a paragraph number, a line number, and/or a pixel-based indication, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that may include a first subset of observations, of the set of observations, and a test set 325 that may include a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

FIG. 3B is a diagram illustrating applying the trained machine learning model 345 to a new observation. As shown by reference number 350, the machine learning system may receive a new observation (or a set of new observations), and may input the new observation to the machine learning model 345. As shown, the new observation may include a first feature of "description," a second feature of "storage," a third feature of "instance," and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of 2 for the target variable of section number for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as an instruction to generate a ticket associated with section 2. Additionally, or alternatively, the machine learning system may perform an automated action and/or may cause an automated action to be performed (e.g., by instructing another device to perform the automated action), such as generating (or triggering a tracking system to open) a ticket associated with section 2. As another example, if the machine learning system were to predict a value of 3 for the target variable of section number, then the machine learning system may provide a different recommendation (e.g., an instruction to generate a ticket associated with section 3) and/or may perform or cause performance of a different automated action (e.g., generating (or triggering a tracking system to open) a ticket associated with section 3). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., negative and associated with section 1), then the machine learning system may provide a first recommendation, such as an instruction to generate a ticket associated with section 1. Additionally, or alternatively, the machine learning system may perform a first automated action and/or may cause a first automated action to be performed (e.g., by instructing another device to perform the automated action) based on classifying the new observation in the first cluster, such as generating (or triggering a tracking system to open) a ticket associated with section 1. As another example, if the machine learning system were to classify the new observation in a second cluster (e.g., positive and associated with section 4), then the machine learning system may provide a second (e.g., different) recommendation (e.g., an instruction to refrain from generating a ticket associated with section 4) and/or may perform or cause performance of a second (e.g., different) automated action, such as refraining from generating (or refraining from triggering a tracking system to open) a ticket associated with section 4.

In this way, the machine learning system may apply a rigorous and automated process to identifying a location within an instruction document. The machine learning system may enable recognition and/or identification of tens, hundreds, thousands, or millions of features and/or feature values for tens, hundreds, thousands, or millions of observations, thereby increasing accuracy and consistency and reducing delay associated with identifying the location relative to requiring computing resources to be allocated for tens, hundreds, or thousands of operators to manually identifying the location using the features or feature values. Additionally, the machine learning system may identify locations associated with smaller clusters rather than larger clusters (e.g., associated with less feedback) and/or associated with positive words rather than negative words (e.g., associated with positive clusters rather than negative clusters). As a result, the machine learning system may prevent power and processing resources from being wasted on updates to locations associated with rare negative feedback (and/or associated with generally positive feedback).

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
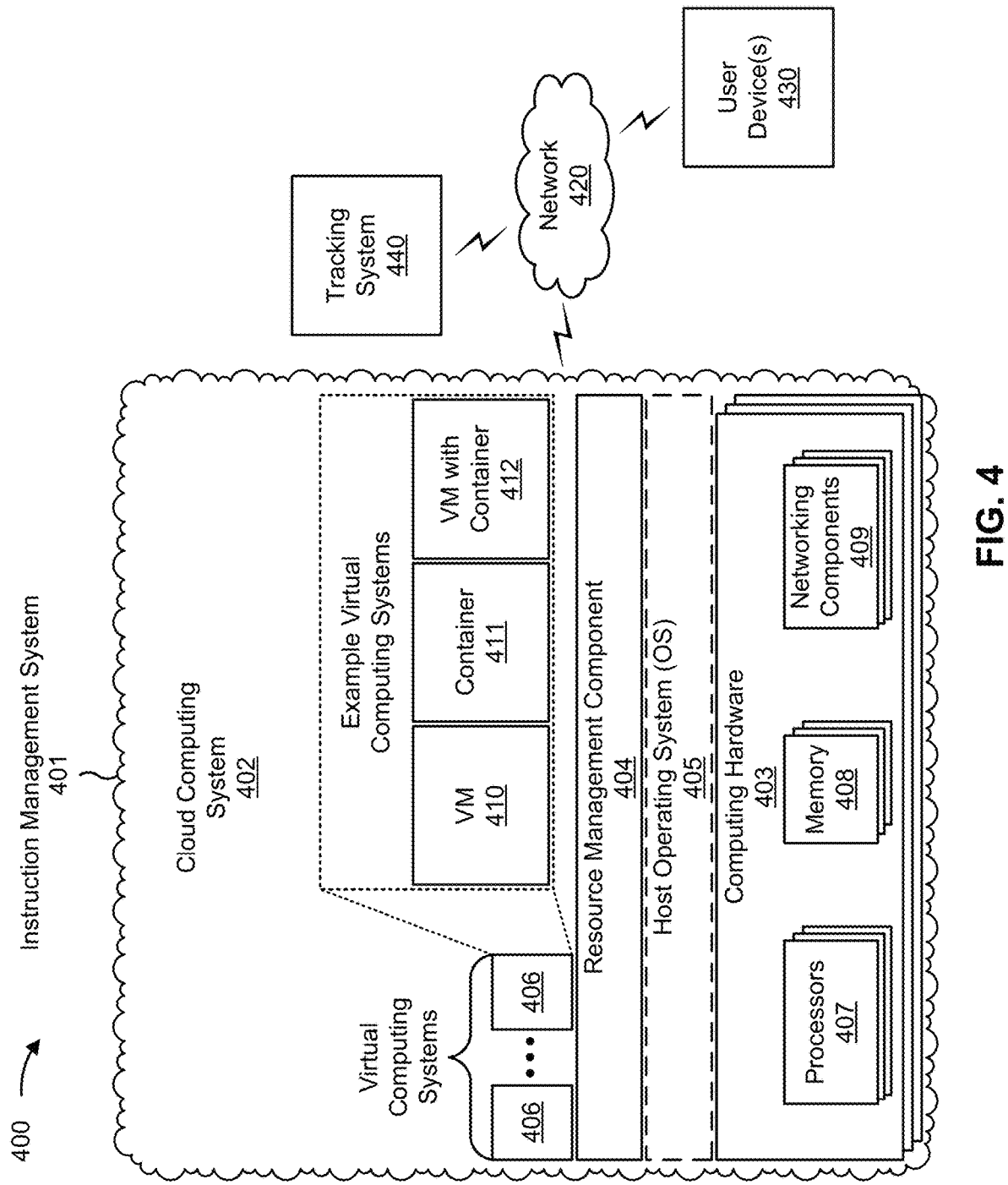
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a instruction management system 401, which may include one or more elements of and/or may execute within a cloud computing system 402. The cloud computing system 402 may include one or more elements 403-412, as described in more detail below. As further shown in FIG. 4, environment 400 may include a network 420, one or more user devices 430, and/or a tracking system 440. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the instruction management system 401 may include one or more elements 403-412 of the cloud computing system 402, may execute within the cloud computing system 402, and/or may be hosted within the cloud computing system 402, in some implementations, the instruction management system 401 may not be cloud-based (e.g., may be implemented outside of a cloud computing system) or may be partially cloud-based. For example, the instruction management system 401 may include one or more devices that are not part of the cloud computing system 402, such as device 500 of FIG. 5, which may include a standalone server or another type of computing device. The instruction management system 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The user device(s) 430 may include one or more devices capable of receiving, generating, storing, processing, and/or providing information associated with instruction documents, as described elsewhere herein. The user device(s) 430 may include a communication device and/or a computing device. For example, the user device(s) 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device(s) 430 may communicate with one or more other devices of environment 400, as described elsewhere herein.

The tracking system 440 may include one or more devices capable of receiving, generating, storing, processing, and/or providing information associated with tickets, as described elsewhere herein. The tracking system 440 may include a communication device and/or a computing device. For example, the tracking system 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The tracking system 440 may include an issue tracking system, such as Jira® or Bugzilla®, among other examples. The tracking system 440 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
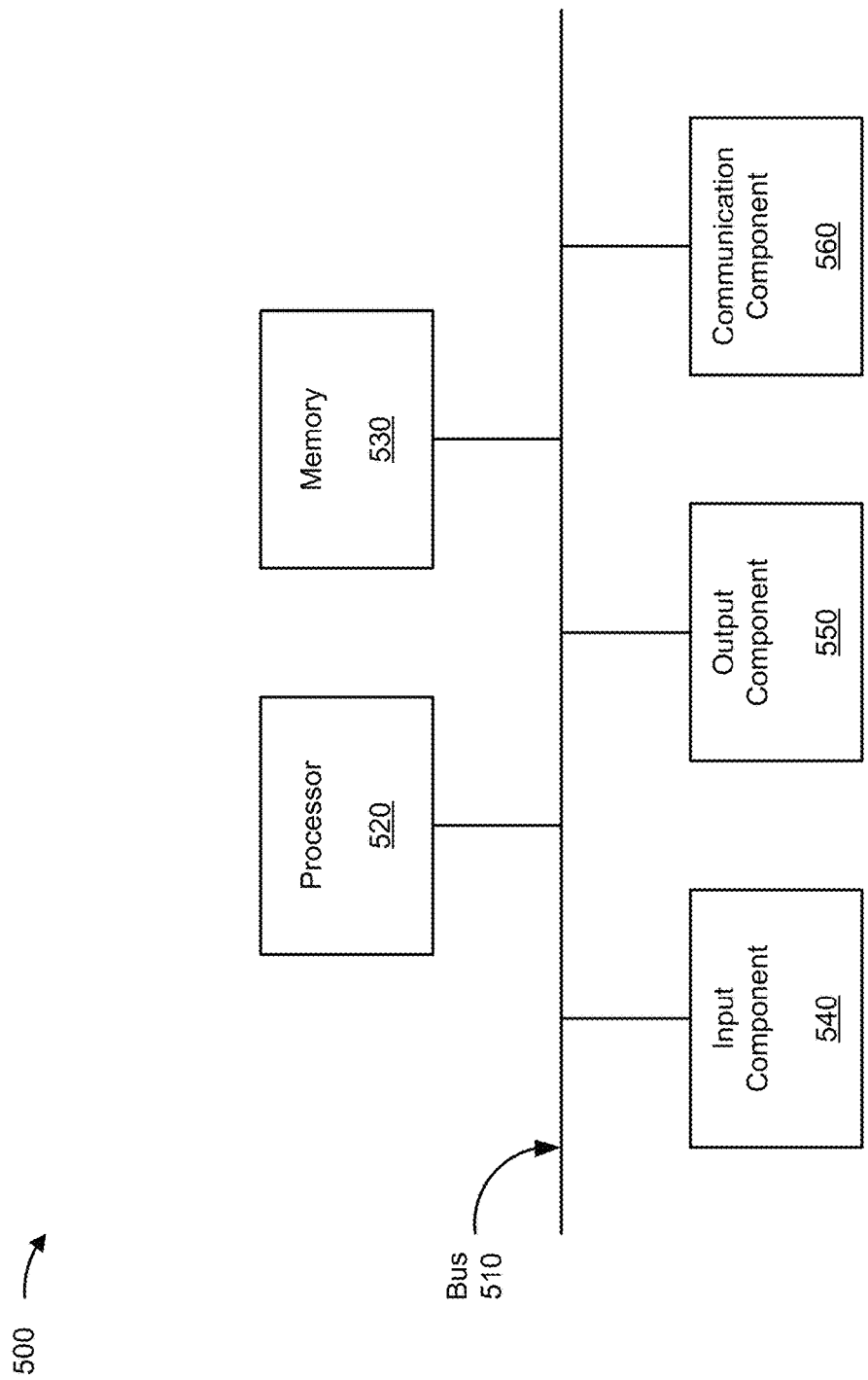
FIG. 5 is a diagram of example components of one or more devices of FIG. 4, in accordance with some embodiments of the present disclosure.

FIG. 5 is a diagram of example components of a device 500 associated with automating compliance activities for cloud-based applications using machine learning. The device 500 may correspond to a user device 430 and/or a tracking system 440. In some implementations, the user device 430 and/or the tracking system 440 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
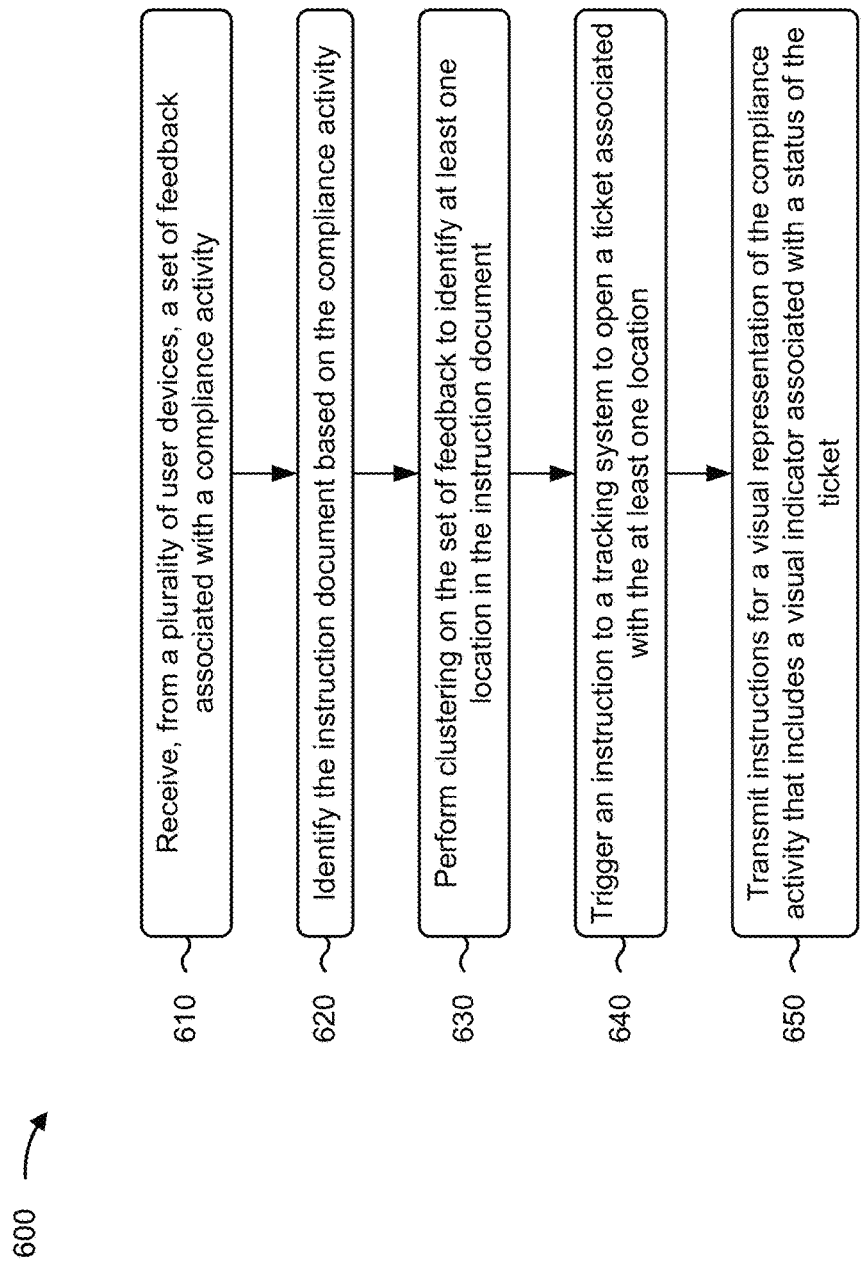
FIG. 6 is a flowchart of an example process relating to automatic updates to instruction documents using crowdsourcing, in accordance with some embodiments of the present disclosure.

FIG. 6 is a flowchart of an example process 600 associated with automatic updates to instruction documents using crowdsourcing. In some implementations, one or more process blocks of FIG. 6 may be performed by the instruction management system 401. In some implementations, one or more process blocks of FIG. 6 may be performed by another device or a group of devices separate from or including the instruction management system 401, such as the user device(s) 430 and/or the tracking system 440. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving, from a plurality of user devices, a set of feedback associated with a compliance activity (block 610). For example, the instruction management system 401 (e.g., using processor 520, memory 530, input component 540, and/or communication component 560) may receive, from a plurality of user devices, a set of feedback associated with a compliance activity, as described above in connection with reference number 120 of FIG. 1A. As an example, a plurality of users of the plurality of user devices may interact with UIs (e.g., via a keyboard, a mouse, a touchscreen, or another type of input component) and trigger the plurality of user devices to transmit the set of feedback. The user devices may transmit the set of feedback in response to a plurality of communications from the instruction management system 401.

As further shown in FIG. 6, process 600 may include identifying the instruction document based on the compliance activity (block 620). For example, the instruction management system 401 (e.g., using processor 520 and/or memory 530) may identify the instruction document based on the compliance activity, as described above in connection with reference number 125 of FIG. 1B. As an example, the instruction document may be associated with an identifier (e.g., a filename, an index, and/or another type of alphanumeric identifier), and the instruction management system 401 may determine the identifier associated with the instruction document by mapping the identifier associated with the instruction document to an identifier associated with the compliance activity.

As further shown in FIG. 6, process 600 may include performing clustering on the set of feedback to identify at least one location in the instruction document (block 630). For example, the instruction management system 401 (e.g., using processor 520 and/or memory 530) may perform clustering on the set of feedback to identify at least one location in the instruction document, as described above in connection with reference number 130 of FIG. 1B. As an example, the instruction management system 401 may extract a set of indicators, from the set of feedback, that are associated with the at least one location. Additionally, or alternatively, the instruction management system 401 may use machine learning (e.g., as described in connection with FIGS. 3A-3B) to identify the at least one location.

As further shown in FIG. 6, process 600 may include triggering an instruction to a tracking system to open a ticket associated with the at least one location (block 640). For example, the instruction management system 401 (e.g., using processor 520 and/or memory 530) may trigger an instruction to a tracking system to open a ticket associated with the at least one location, as described above in connection with reference number 135 of FIG. 1B. As an example, the instruction management system 401 may determine to open the ticket, associated with the at least one location, based on the set of feedback satisfying a condition. For example, the instruction management system 401 may trigger the instruction in response to a quantity of negative feedback associated with the at least one location satisfying a triggering threshold. Additionally, or alternatively, the instruction management system 401 may trigger the instruction in response to a sentiment measurement (e.g., associated with negativity), associated with the set of feedback and associated with the at least one location, satisfying a sentiment threshold. In some implementations, the instruction may include an indication of the at least one location (e.g., a section number, a section name, a sub-section name, a sub-section number, a page number, a paragraph number, a line number, and/or a pixel-based indication, among other examples).

As further shown in FIG. 6, process 600 may include transmitting instructions for a visual representation of the compliance activity that includes a visual indicator associated with a status of the ticket (block 650). For example, the instruction management system 401 (e.g., using processor 520, memory 530, and/or communication component 560) may transmit instructions for a visual representation of the compliance activity that includes a visual indicator associated with a status of the ticket, as described above in connection with reference number 180 of FIG. 1F. As an example, the visual representation may include a tabular representation of the compliance activity in association with the visual indicator.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1G, 2, and/or 3A-3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for accurately identifying and updating portions of an instruction document using data indicating timing of actions performed by users, the system comprising:
   one or more memories; and
   one or more processors, communicatively coupled to the
      one or more memories, configured to:

receive a set of data structures representing information associated with an activity performed by users, wherein the set of data structures indicates sequences of actions performed by the users and corresponding timestamps for the actions;

identify the instruction document based on the activity;

identify an action, of the actions, that is associated with an amount of time that satisfies a threshold;

query a database to identify at least one location in the instruction document that corresponds to the action based on mapping locations to the actions;

trigger an instruction to a tracking system to open a ticket associated with the at least one location; and transmit instructions for a visual representation of the activity that includes a visual indicator associated with a status of the ticket.

2. The system of claim 1, wherein the one or more processors are further configured to:

receive, from the tracking system, an updated status of the ticket; and transmit instructions to modify the visual representation with an updated visual indicator associated with the updated status of the ticket.

3. The system of claim 1, wherein the one or more processors are further configured to:

receive, from a plurality of user devices, a set of feedback associated with a compliance activity, wherein the set of feedback includes data representing tickets associated with the activity.

4. The system of claim 1, wherein the one or more processors, to identify the instruction document, are configured to:

map, using a database, an identifier associated with the activity to an identifier associated with the instruction document.

5. The system of claim 1, wherein the one or more processors are further configured to:

receive, from a plurality of user devices, a set of feedback associated with a compliance activity; and cluster the set of feedback according to semantic similarities, wherein identifying the at least one location is based on clustering the set of feedback.

6. The system of claim 1, wherein the one or more processors, to trigger the instruction to the tracking system, are configured to:

identify a set of users associated with the instruction document; and transmit the instruction including an identifier associated with the instruction document and indicating the set of users.

7. A method of accurately identifying and updating portions of an instruction document using data indicating timing of actions performed by users, comprising:

receiving a set of data structures representing information associated with an activity performed by users, wherein the set of data structures indicates sequences of actions performed by the users and corresponding timestamps for the actions;

identifying the instruction document associated with the activity;

identifying an action, of the actions, that is associated with an amount of time that satisfies a threshold;

querying a database to identify at least one location in the instruction document that corresponds to the action based on mapping locations to the actions; and triggering an instruction to a tracking system to open a ticket associated with the activity and the at least one location.

8. The method of claim 7, further comprising:

receiving, from the tracking system, an indication that the ticket is resolved; and archiving the set of feedback in response to the indication.

9. The method of claim 7, further comprising:

transmitting a plurality of communications to a plurality of user devices; and receiving a set of feedback, associated with the instruction document, in responses to the plurality of communications.

10. The method of claim 9, wherein identifying the at least one location comprises:

extracting a set of indicators, from the set of feedback, that are associated with the at least one location.

11. The method of claim 9, wherein identifying the at least one location comprises:

performing clustering on the set of feedback, according to semantic similarities, to identify the at least one location.

12. The method of claim 7, further comprising:

receiving, from a plurality of user devices, a set of feedback associated with the instruction document;

selecting one or more extracts, from the set of feedback; and transmitting the instruction including the one or more extracts.

13. The method of claim 7, wherein triggering the instruction to the tracking system comprises:

transmitting the instruction indicating a priority level associated with the activity.

14. A non-transitory computer-readable medium storing a set of instructions for accurately identifying and updating portions of an instruction document using data indicating timing of actions performed by users, the set of instructions comprising:

one or more instructions that, when executed by one or more processors of a device, cause the device to:

receive a set of data structures representing information associated with an activity performed by users, wherein the set of data structures indicates sequences of actions performed by the users and corresponding timestamps for the actions;

identify an action, of the actions, that is associated with an amount of time that satisfies a threshold;

query a database to identify at least one location in the instruction document that corresponds to the action based on mapping locations to the actions; and transmit instructions for a visual representation that includes a visual indicator associated with the at least one location.

15. The non-transitory computer-readable medium of claim 14, wherein the one or more instructions, when executed by the one or more processors, further cause the device to:

receive, from a tracking system, a status associated with the instruction document; and transmit instructions to modify the visual representation with a visual indicator associated with the status.

16. The non-transitory computer-readable medium of claim 14, wherein the one or more instructions further cause the device to:

receive, from a tracking system, an indication that one or more activities are finished;

transmit, in response to the indication, a plurality of communications to a plurality of user devices; and receive a set of feedback, associated with the instruction document, in responses to the plurality of communications.

17. The non-transitory computer-readable medium of claim 14, wherein the one or more instructions further cause the device to:

receive, from a plurality of user devices, a set of feedback associated with the instruction document; and determine to include the visual indicator, associated with the at least one location, in the instructions for the visual representation based on the set of feedback satisfying a condition.

18. The non-transitory computer-readable medium of claim 14, wherein the one or more instructions, when executed by the one or more processors, further cause the device to:

identify the activity associated with the instruction document, wherein the visual indicator further indicates a priority level associated with the activity.

19. The non-transitory computer-readable medium of claim 18, wherein the priority level associated with the activity is based on a due date and an impact.

20. The non-transitory computer-readable medium of claim 14, wherein the one or more instructions, that cause the device to transmit the instructions for the visual representation, cause the device to:

receive a set of credentials; and transmit the instructions for the visual representation in response to verifying the set of credentials.

\* \* \* \* \*